United States Patent [19]

LeBlanc

[11] Patent Number: 5,009,774
[45] Date of Patent: Apr. 23, 1991

[54] PULSELESS SCREEN

[75] Inventor: Peter E. LeBlanc, Worthington, Mass.

[73] Assignee: Beloit Corporation, Beloit, Wis.

[21] Appl. No.: 429,874

[22] Filed: Oct. 30, 1989

[51] Int. Cl.$^5$ .............................................. B07B 1/20
[52] U.S. Cl. .................................. 209/273; 209/285; 209/306
[58] Field of Search ............... 209/273, 305, 306, 290, 209/291, 17, 300, 211, 285, 286, 250, 240, 380; 210/413–415

[56] References Cited

U.S. PATENT DOCUMENTS

| | | | |
|---|---|---|---|
| 1,864,818 | 6/1932 | Haug | 209/273 |
| 1,974,651 | 9/1934 | Haug | 209/273 |
| 3,053,391 | 9/1962 | Nelson | 210/304 |
| 3,545,621 | 12/1970 | Lamort | 210/414 X |
| 3,581,893 | 6/1971 | Rich | 209/273 |
| 3,735,873 | 5/1973 | Bergstedt | 209/273 X |
| 3,865,243 | 2/1975 | Salminen | 209/306 |
| 4,166,028 | 8/1979 | Weber | 209/273 X |
| 4,216,918 | 8/1980 | Kahmann et al. | 209/17 X |
| 4,252,641 | 2/1981 | Martin | 209/273 |
| 4,316,768 | 2/1982 | Goddard | 209/273 |
| 4,710,287 | 12/1987 | Henrich et al. | 209/270 |

FOREIGN PATENT DOCUMENTS

| | | | |
|---|---|---|---|
| 1198662 | 12/1959 | France | 210/414 |
| 3243391 | 10/1988 | Japan | 209/273 |
| 3243392 | 10/1988 | Japan | 209/273 |

Primary Examiner—Donald T. Hajec
Attorney, Agent, or Firm—Raymond W. Campbell; Dirk J. Veneman

[57] ABSTRACT

A screening apparatus comprises a pair of stationary concentric screens with a plurality of foils rotating therebetween and adjacent thereto, the individual foils being radially aligned. The screening apparatus comprises a tangentially disposed slurry inlet and a diametrically and tangentially disposed heavy rejects outlet at the end of a heavy rejects trap. The light reject/accepts slurry flows into the screening zone and, after separation, is discharged at an end of the screening apparatus by way of respective light rejects and accepts outlets. The accept outlet is located axially with respect to the screen cylinders and rotating foils so the pressure pulses are virtually eliminated in the screening process. The apparatus may be constructed for vertical or horizontal rotation of the foils.

22 Claims, 2 Drawing Sheets

FIG. 2
FIG. 3
FIG. 4
FIG. 5
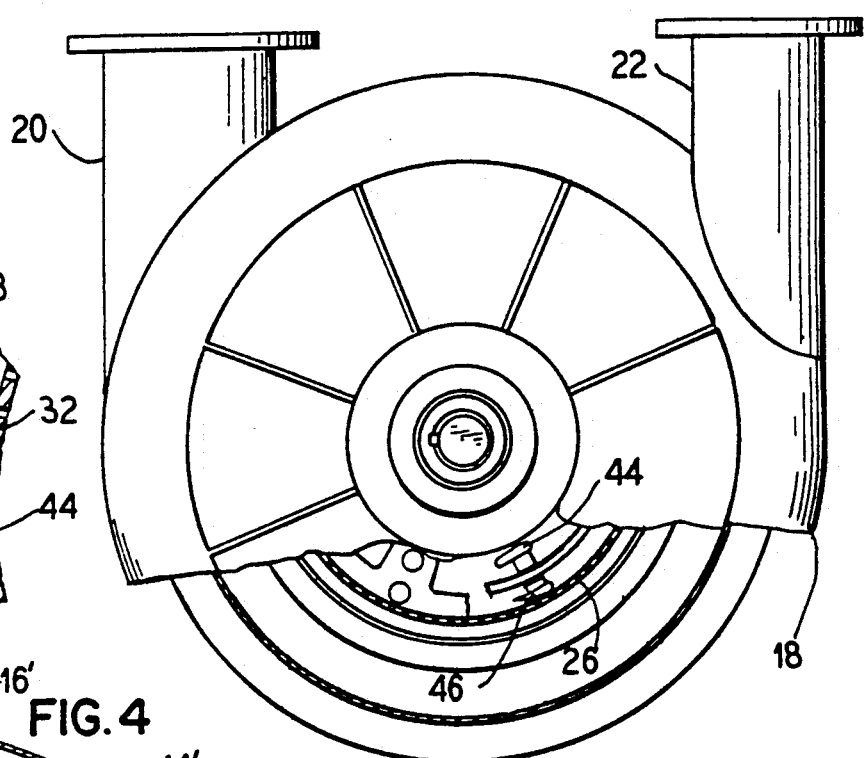
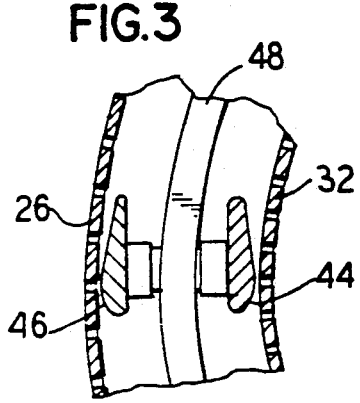
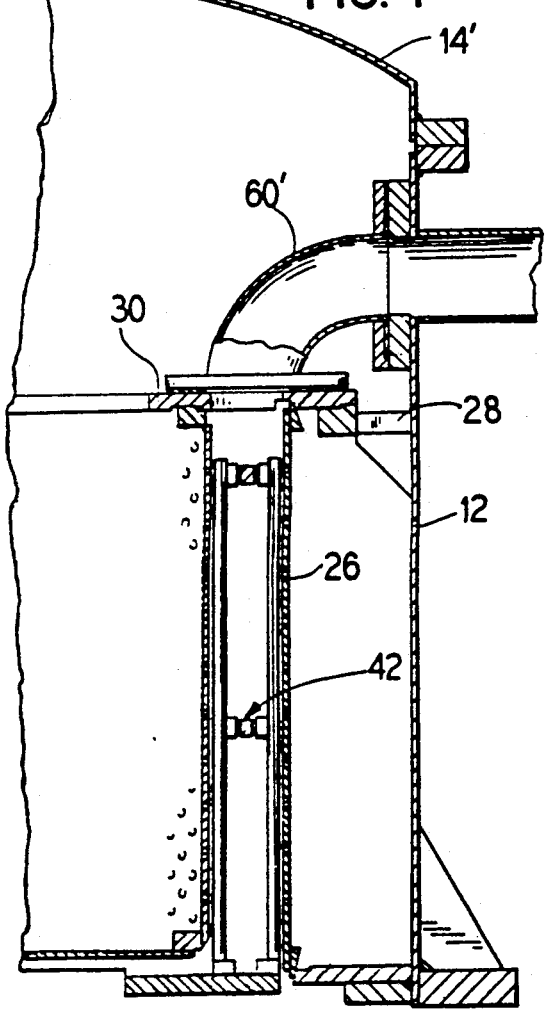
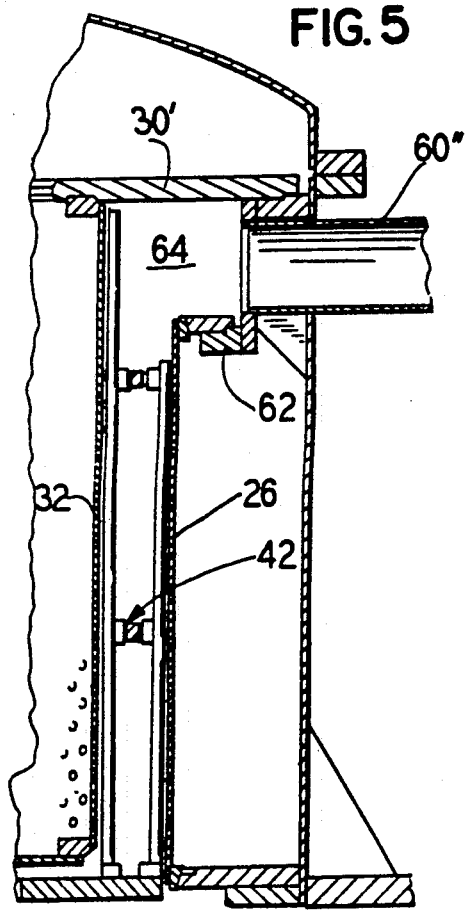

PULSELESS SCREEN

BACKGROUND OF THE INVENTION i. Technical Field

The present invention relates to screening apparatus for separating accepts and rejects of a slurry in preparing pulps for use in a paper making machine.

ii. Prior Art

Screening apparatus are well known in the art. For example, A. J. Haug in U.S. Pat. No. 1,864,818, discloses a pulp screening machine which employs a rotary screening drum for producing a centrifugal effect on the stock in contact with the drum, and maintains the drum submerged in screened stock and applies a substantially uniform hydraulic pressure to the drum at points spaced uniformly thereabout to obtain substantially equal screening operations about the circumference of the screen drum.

In U.S. Pat. No. 1,974,651, A. J. Haug discloses a pulp screening machine which employs a horizontal screening machine which employs a horizontal screening drum in which the stock is moved adjacent to the surface of the drum in a circumferential direction. In this apparatus, the stock is subjected to a motion so as to create temporary localized reversals of the normal flow of stock through the screening surface in order to loosen the tailings which cling to the screening surface.

G. L. Nelson, in U.S. Pat. No. 3,053,391 discloses a vertically disposed screening apparatus in which the incoming stock is fed into the top of the system and flows between a pair of screens having offset foils running therebetween.

A. C. Martin, in U.S. Pat. No. 4,252,641 discloses a horizontal screening apparatus in which the axes of a cylindrical screen plate and a casing surrounding the screen plate are offset to one another to provide an enlargement in the chamber surrounding the screen plate. A partition is provided in the enlarged area and extends from the inlet opening to approximately the rejects outlet and a baffle is provided about the screen helically and substantially coextensively with the partition to provide a passage of decreasing cross-sectional area approaching the rejects outlet to provide an optimum velocity of material which prevents plugging of the passage by larger particles.

D. A. Goddard, in U.S. Pat. No. 4,316,768 discloses a screening apparatus which includes a centrifugal pump which is mounted for rotation in a housing coaxial with a cylindrical screen which extends about a tubular hub portion of the pump. In this screening apparatus, a slurry is delivered to the top of the centrifugal pump and forced outwardly and upwardly by the pump to the cylindrical screen. The rejects are forced into and collected in a rejects zone for later flushing.

Modern paper machines are very sensitive to pressure pulses. Existing screens usually produce pulses which are sufficiently large such that often "barring" occurs on the paper machine. The troublesome pulses occur when a foil or other pulse creating device passes the accepts outlet on a conventional screen. It is therefore desirable to eliminate or at least minimize such pulses.

It is therefore an object of the present invention to eliminate, or at least minimize, pressure pulses in the accepts flow in a screening apparatus.

SUMMARY OF THE INVENTION

According to the present invention, the above object is achieved by eliminating a radially disposed accepts outlet and replacing the same with an accepts outlet which is totally axial in its position relative to the screen. It is also advisable to so isolate the inlet connection for further reduction in transmitted pulses.

Although referred to below as being a vertical screen, the apparatus may be mounted with the screens and the axis of rotation horizontal, in that the screen is a pressure screen operable independent of its orientation.

More specifically, the screening apparatus of the present invention has a generally vertical or horizontal orientation and employs a pair of vertical or horizontal coaxial screen cylinders fixed within a housing which has an axial accepts outlet at one end and at least one light rejects outlet at that end beyond the screens. A heavy rejects outlet is provided at the other end of the apparatus, tangential to the apparatus, and substantially diametrically opposed to the slurry inlet.

A pair of foil structures are rotated between the screen cylinders at approximately 45'/sec velocities. The material to be screened enters through the tangential slurry inlet and flows to the space between the inner and outer screen cylinders. The accepts pass through the screen cylinders and flow by way of an accepts collecting chamber to the axial accepts outlet. The light rejects are removed through an outlet which may extend parallel to the accepts outlet or at 90° with respect thereto as will be evident from the description below.

As is radially apparent to those skilled in the art, the use of multiple screen cylinders is not new per se; however, the use of such cylinders in accordance with the unique features of the invention has proved to be highly advantageous. For example, in previous screening apparatus using a pair of screen cylinders, the foils sweeping the inner and outer screen cylinders were not aligned. With aligned foils, the positive to negative pressure gradients become substantially uniform for the multiplicity of foils traversing the screening zone. This design also allows removal and replacement of both inner and outer screen cylinders without removing the rotating foil assembly.

As mentioned above, many screens are fed from the top so that the heavier rejects flow to the bottom, and no provision is made for light rejects. According to the present invention, the heavy rejects are forced outwardly and are trapped by the centrifugal force of the incoming slurry so as to be trapped in the bottom of the apparatus which therefore prevents the screen cylinders from being subjected to the heavier particles and the resulting potential damage. The light rejects encountered by the screen cylinders are directed upwardly and basically flow out of the top of the apparatus with only the accepts being passed through the screen cylinders.

According to a particular feature of the invention, and in contrast to previous designs in which the foils swept passed the general location of the accepts outlet, the accepts outlet has been moved from adjacent to the screening zone to a location displaced from the axial with respect to the screening zone so that pressure pulses are virtually eliminated.

BRIEF DESCRIPTION OF THE DRAWINGS

Other objects, features, and advantages of the invention, its organization, construction and operation will be best understood from the following detailed description, taken in conjunction with the accompanying drawings, in which:

FIG. 2 is a bottom view, partially broken away, of the apparatus illustrated in FIG. 1;

FIG. 3 is a fragmentary sectional view of the foils and screen cylinders of the screening apparatus of FIG. 1;

FIG. 4 is a fragmentary sectional view of a first modification of the screening apparatus of FIG. 1 showing the light rejects discharged through the side of the apparatus; and FIG. 5 is a fragmentary sectional view, similar to that in FIG. 4, showing a further modification of the side discharge of the light rejects.

DETAILED DESCRIPTION OF THE PREFERRED EMBODIMENT

Figure 1:
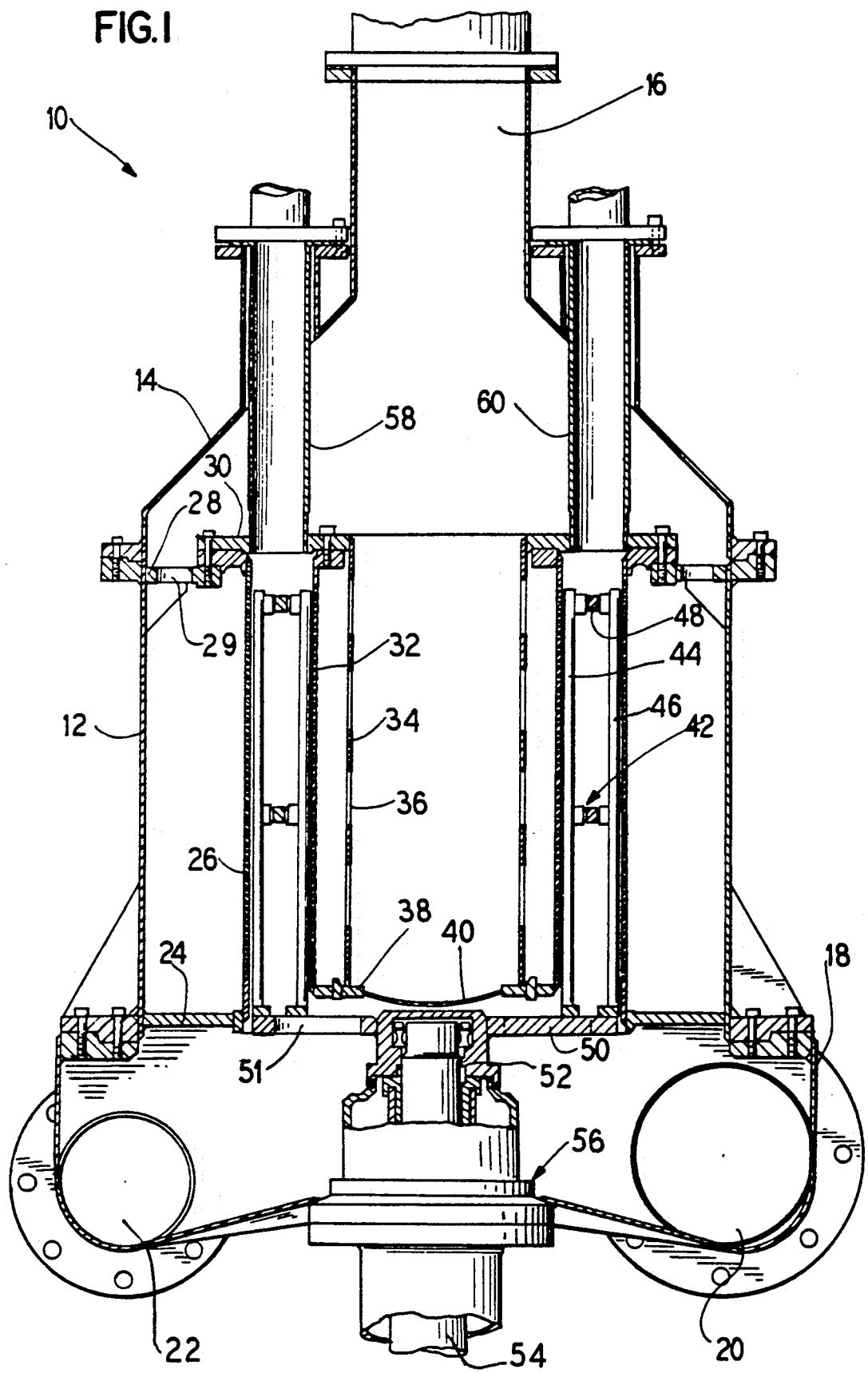
FIG. 1 is an elevational view, shown in cross-section, of a screening apparatus constructed in accordance with the present invention.

Referring to FIG. 1, a screening apparatus is generally illustrated at 10 as comprising a housing including an intermediate section 12 supporting a top section 14 which has an axially disposed accepts outlet 16. A bottom section 18 supports the middle section 12 and comprises a tangentially oriented slurry intake 20 and a tangentially oriented heavy rejects outlet 22 diametrically disposed with respect to the slurry inlet 20.

An annular ring 24 substantially separates the middle section 12 and the lower section 18. The annular ring 24 is connected to and supports the lower end of a screen cylinder 26 the upper end of which is connected to and supported by a ring 30 connected to an apertured ring 28 including a plurality of apertures 29.

An inner screen cylinder 32 is connected to and supported at its upper end by the ring 30 spaced from the screen cylinder 26 and further spaced from an apertured cylinder 34, having apertures 36 therein. The cylinders 32 and 34 are supported at their lower ends by an extension 38 of a closed bottom 40 of the apertured cylinder 34.

The screen cylinders may be profiled cylinders of the type commonly used in pressure screens of other types.

A foil structure 42 is rotatably supported on a plate 50. The plate 50 is connected at 52 to a shaft 54 rotatably supported by a bearing 56 at the bottom wall of the bottom section 18. The foil structure 42 comprises a plurality of circumferentially spaced foils 44 and a plurality of circumferentially spaced foils 46, with the respective foils 44 and 46 radially aligned and secured to one another by a plurality of rings 48.

While foils are believed to be a preferred pulse inducing means for use in the present invention, it should be recognized that most any other type of pulsing means such as cam-style rotors, bump rotors and the like, well-known to those in the industry, also can be used.

A plurality of light rejects outlets comprise a plurality of conduits 58, 60 in communication with the space between the screen cylinders 26, 32 and extending out of the top section 14 parallel to the accepts outlet 16.

In operation, the slurry is introduced into the slurry inlet 20 and the heavy rejects, through centrifical force, are forced outwardly and trapped for exit through the heavy rejects outlet 22. The light/accepts slurry remaining flows upwardly through the apertures 51 in the plate 50 (rotated by way of shaft 54) into the space between the two cylindrical screens 26, 32. The light rejects cannot pass through the screen cylinders and flow upwardly through the light rejects outlets 58, 60, while the accepts flow through the screens 26 and 32. Accepts flowing through screen 26 are received between the screen 26 and the sidewall of middle section 12 and flow upwardly through the apertures 29 into the conical top section 14. On the inner side, accepts flow through the screen 32 and through the apertures 36 and upwardly into the conical top section 14. The accepts from the outer chamber and the inner chamber join in the top section 14 and exit through the accepts outlet 16.

As is evident, the rotating foils do not pass an adjacent accept outlet so that pressure pulses are virtually eliminated.

Referring to FIGS. 2 and 3, the alignment of the foils 44, 46 is illustrated in greater detail, the foils being connected to one another, in each instance, by a ring 48.

Referring to FIG. 4, a first modification for the light rejects outlet is illustrated as comprising a 90° bend in the conduit so that the conduit exits the housing above the screening zone and through the housing in the radial direction. Otherwise, the screen apparatus is basically the same as illustrated in FIG. 1.

Also as basically illustrated in FIG. 1, FIG. 5 shows a further modification of the light rejects discharge in which a chamber 64 is formed from the upper portion of the apertured cylinder 34, a supporting ring 62 and a flange for conduit 60". In all other respects, however, the apparatus is substantially the same as that illustrated in FIG. 1.

Although we have described our invention by reference to a particular illustrated embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

I claim:

1. A screening apparatus for separating accepts and rejects of a slurry fed to the apparatus, said apparatus comprising:

a closed hollow housing including at least one side wall, first and second ends, and a slurry inlet at said first end, said housing having a longitudinal axis;

cylindrical screen means fixedly mounted in said housing, a first side of said screen means being in communication with said slurry inlet;

said screen means being disposed about said axis and extending generally axially in said housing from near said first end to near said second end;

a rotatable drive shaft extending into and journaled to said housing;

pulsing means connected to said drive shaft for rotation in a path of rotation adjacent said screen means on said first side of said screen means for inducing flow of slurry through said screen means;

a rejects outlet in flow communication with said first side of said screen means and in communication with the path of rotation of said pulsing means;

and an accepts outlet in flow communication with a second side of said screen means, said accepts outlet being located at one end of said screen means axially aligned with said screen means;

whereby the accepts are discharged axially from said housing generally along said axis of said housing of said screening apparatus.

2. The screening apparatus of claim 1, wherein:

said rejects outlet extends through said side wall of said housing.

3. The screening apparatus of claim 1, wherein: said rejects outlet comprises a conduit, including an elbow, extending through said side wall.

4. A screening apparatus for separating accepts and rejects of a slurry fed to the apparatus, said apparatus comprising:
- a closed hollow housing including at least one side wall, first and second ends, and a slurry inlet at said first end, said housing having a longitudinal axis;
- cylindrical screen means including a pair of concentric screen cylinders mounted spaced apart to define a gap therebetween, said slurry inlet being in flow communication with said gap, said screen means being fixedly mounted in said housing; a first side of each of said screen cylinders being in communication with said slurry inlet;
- said screen cylinders being disposed about said axis and extending generally axially in said housing from near said first end to near said second end;
- a rotatable drive shaft extending into and journaled to said housing;
- pulsing means connected to said drive shaft for rotation in a path of rotation adjacent said screen cylinders for inducing flow of slurry through said screen cylinders;
- said pulsing means comprising a plurality of first foils mounted circumferentially spaced for rotation adjacent the outer one of said screen cylinders and a plurality of second foils each aligned with a respective first foil for rotation therewith adjacent the inner one of said screen cylinders;
- a rejects outlet in flow communication with said first side of said screen means and in communication with the path of rotation of said pulsing means;
- and an accepts outlet in flow communication with a second side of said screen means, said accepts outlet being located at one end of said screen means axially aligned with said screen means;
- whereby the accepts are discharged axially from said housing generally along said axis of said housing of said screening apparatus.

5. The screening apparatus of claim 4, wherein: said screen means further comprises an apertured cylinder fixedly mounted spaced from the inner screen cylinder, said apertured cylinder comprising a side wall including openings therethrough for passing accepts, a closed bottom and an open top in communication with said accepts outlet.

6. A screening apparatus for separating accepts and rejects of a slurry fed to the apparatus, said apparatus comprising:
- a closed hollow housing including at least one side wall, first and second ends, and a slurry inlet at said first end, said housing having a longitudinal axis;
- cylindrical screen means fixedly mounted in said housing, a first side of said screen means being in communication with said slurry inlet;
- said screen means being disposed about said axis and extending generally axially in said housing from near said first end to near said second end;
- a rotatable drive shaft extending into and journaled to said housing;
- pulsing means connected to said drive shaft for rotation in a path of rotation adjacent said screen means on said first side of said screen means for inducing flow of slurry through said screen means;
- a plurality of rejects outlets spaced apart about said housing in flow communication with said first side of said screen means and in communication with the path of rotation of said pulsing means;
- and an accepts outlet in flow communication with a second side of said screen means, said accepts outlet being located at one end of said screen means axially aligned with said screen means;
- whereby the accepts are discharged axially from said housing generally along said axis of said housing of said screening apparatus.

7. A screening apparatus for separating accepts and rejects of a slurry fed to the apparatus, said apparatus comprising:
- a closed hollow housing including at least one side wall, first and second ends, and a slurry inlet at said first end, said housing having a longitudinal axis;
- cylindrical screen means fixedly mounted in said housing, a first side of said screen means being in communication with said slurry inlet;
- said screen means being disposed about said axis and extending generally axially in said housing from near said first end to near said second end;
- a rotatable drive shaft extending into and journaled to said housing;
- pulsing means connected to said drive shaft for rotation in a path of rotation adjacent said screen means for inducing flow of slurry through said screen means;
- a first rejects outlet for lighter rejects, said first rejects outlet being in flow communication with said first side of said screen means and in communication with the path of rotation of said pulsing means;
- a second rejects outlet for heavier rejects, said second rejects outlet being at said first end of said housing and spaced from said slurry inlet, said housing being a cylindrical housing and said slurry inlet and said second rejects outlet extending tangential to said housing;
- and an accepts outlet in flow communication with a second side of said screen means, said accepts outlet being located at one end of said screen means axially aligned with said screen means;
- whereby the accepts are discharged axially from said housing generally along said axis of said housing of said screening apparatus.

8. A screening apparatus for separating accepts and rejects of a slurry fed to the apparatus, said apparatus comprising:
- a closed hollow housing including at least one side wall, first and second ends, and a slurry inlet at said first end, said housing having a longitudinal axis;
- cylindrical screen means fixedly mounted in said housing, a first side of said screen means being in communication with said slurry inlet;
- said screen means being disposed about said axis and extending generally axially in said housing from near said first end to near said second end;
- a rotatable drive shaft extending into and journaled to said housing;
- pulsing means connected to said drive shaft for rotation in a path of rotation adjacent said screen means for inducing flow of slurry through said screen means;
- a rejects outlet in flow communication with said first side of said screen means and in communication with the path of rotation of said pulsing means, said rejects outlet extending through one of said ends of said housing;

and an accepts outlet in flow communication with a second side of said screen means, said accepts outlet being located at one end of said screen means axially aligned with said screen means;

whereby the accepts are discharged axially from said housing generally along said axis of said housing of said screening apparatus.

9. The screening apparatus of claim 1, wherein:

said rejects outlet comprises a chamber in communication with said first side of said means and a conduit connected to said chamber and extending through said side wall.

10. Screening apparatus for separating accepts and rejects of a slurry fed to the apparatus, comprising:

a vertical cylindrical housing including a slurry inlet at the bottom of said housing, a heavy rejects outlet spaced from said inlet at the bottom of said housing, first means defining a generally horizontal arcuate slurry path between said slurry inlet and said heavy rejects outlet;

an axially disposed accepts outlet at the top of said housing, at least one light rejects outlet spaced from said accepts outlet, and second means in communication with and defining a dividing path for the slurry between said first means and said light rejects and accepts outlet;

said second means including first and second spaced, vertical screen cylinders for passing the accepts fixedly mounted in said housing, first and second foil structures mounted for rotation between and adjacent said first and second screen cylinders;

and third means connected to rotate said foil structures, said light rejects passing through the space between said screen cylinders to said light rejects outlet and said accepts passing through said screen cylinders to said accepts outlet.

11. The pulseless screening apparatus of claim 10, wherein:

said at least one light rejects outlet extends parallel to said accepts outlet.

12. The pulseless screening apparatus of claim 10, wherein:

said at least one light rejects outlet extends perpendicular to said accepts outlet.

13. Pulseless screening apparatus for separating heavy rejects, light rejects and accepts from a slurry fed to the apparatus, comprising:

a vertical housing including a generally conical top section, a cylindrical middle section supporting said top section, and a generally cylindrical bottom section supporting said middle section;

a tangentially disposed slurry inlet in said bottom section and a tangentially disposed heavy rejects outlet in said bottom section circumferentially spaced from said inlet for the outflow of heavy rejects forced radially outward from the flow of incoming slurry;

bearing means axially mounted in said bottom section, and a shaft rotatably supported by said bearing means for connection to a rotating drive;

an apertured plate connected to said shaft for rotation therewith and for passing therethrough the slurry containing the light rejects and accepts;

first and second multiple foil structures mounted spaced apart on said plate for rotation therewith in a path of rotation in said middle section, each of said foil structures including a plurality of circumferentially spaced elongate foils with the foils of said first foil structure radially aligned with the foils of said second foil structure, said foil structures receiving the slurry therebetween;

first and second vertically disposed screen cylinders fixed spaced apart in said middle section with the outer surface of said first screen cylinder adjacent said first foil structure and the inner surface of said second screen cylinder adjacent said second foil structure, the light rejects flowing upwardly through and out of the path of rotation of said foil structures and the accepts flowing through said screen cylinders;

a light rejects outlet above said screen cylinders in communication with the path of rotation of said foil structures;

an axially located accepts outlet in said top section;

and accepts collection means communicating with said screen cylinders and said accepts outlet.

14. The pulseless screening apparatus of claim 13, wherein said accepts collection means comprises:

a hollow tube fixedly mounted within said first screen cylinder and including an open top communicating with said accepts outlet, a perforate side wall spaced from said first screen cylinder and a closed bottom adjacent said plate.

15. The pulseless screening apparatus of claim 13, and further comprising:

an annular ring generally coplanar with and receiving said plate therein, said ring fixed to said middle section and sealing said middle section from said bottom section so as to direct the slurry upwardly through said apertured plate.

16. The pulseless screening apparatus of claim 15, wherein:

said second screen cylinder is connected to and supported by said annular ring.

17. The pulseless screening apparatus of claim 13, wherein said accepts collection means comprises:

a hollow tube fixedly mounted within said first screen cylinder and including an open top communicating with said accepts outlet, a perforate side wall spaced from said first screen cylinder and a closed bottom adjacent said apertured plate, said closed bottom including a ring-like extension supporting the bottom of said first screen cylinder.

18. The pulseless screening apparatus of claim 13, and further comprising:

a first ring means at the top of and connected to said middle section and including apertures, as a part of said accepts collection means, communicating said second screen cylinder with said top section;

a second ring means connected to and supported by said first ring means, said second ring means connected to the tops of and supporting each of said screen cylinders and including at least one opening aligned with the space between said screen cylinders for passing the light rejects;

and a conduit extending between said opening and said light rejects outlet.

19. The pulseless screening apparatus of claim 18, wherein said accepts collection means comprises:

a hollow tube fixedly mounted within said first screen cylinder and including an open top communicating with said accepts outlet, a perforate side wall spaced from said first screen cylinder and a closed bottom adjacent said plate;

and said top of said hollow tube connected to and supported by said second ring means.

20. The pulseless screening apparatus of claim 13, wherein said light rejects outlet comprises:
   a conduit in communication with the space between said screen cylinder and extending out of said housing.

21. The pulseless screening apparatus of claim 13, wherein said light rejects outlet comprises:
   a conduit in communication with the space between said screen cylinder and extending parallel to said accepts outlet and out of said housing.

22. The pulseless screening apparatus of claim 13, wherein said light rejects outlet comprises:
   a conduit in communication with the space between said screen cylinder and extending perpendicular to said accepts outlet and out of said housing.

* * * * *